United States Patent Office 3,836,574
Patented Sept. 17, 1974

3,836,574
PROCESS FOR THE MANUFACTURE OF FILM- AND FIBER-FORMING POLYESTERS
Eberhard Achsel, Kelkheim, Taunus, and Siegfried Sommer, Bad Soden, Taunus, Germany, assignors to Farbwerke Hoechst Aktiengesellschaft vormals Meister Lucius & Bruning, Frankfurt am Main, Germany
No Drawing. Continuation of application Ser. No. 177,440, Sept. 2, 1971. This application June 20, 1973, Ser. No. 371,662
Int. Cl. C08g 17/01
U.S. Cl. 260—475 P   5 Claims

ABSTRACT OF THE DISCLOSURE

Film- and fiber-forming polyesters, optionally also polyesters suitable for the processing of plastic articles, are prepared starting from diols and a dicarboxylic acid/dicarboxylic acid alkyl ester mixture, in which the proportion of the number of free carboxyl groups to that of the esterified carboxyl groups is at least 60:40. These starting substances are reacted to form the bis-diol-dicarboxylic acid esters and their lower oligomers, and these substances are then polycondensed in known manner to form high molecular weight polyesters. Preferably, polyethyleneterephthalate is prepared according to this process.

---

This is a continuation of application Ser. No. 177,440, filed Sept. 2, 1971, and now abandoned.

The present invention relates to a process for the manufacture of film- and fiber-forming polyesters.

It is known that the reaction of terephthalic acid and ethylene glycol yields an esterification product containing bis-($\beta$-hydroxyethyl)-terephthalate and its oligomers. At the same time, depending on the glycol amount, polycondensation products of a more or less low polycondensation degree are formed in this reaction. The esterification products are starting substances for a subsequent polycondensation reaction, in which high molecular weight polyethylene terephthalate is formed while glycol is split off. The polycondensation normally is carried out at elevated temperatures and under reduced pressure.

The dicarboxylic acid to be used for making polyesters suitable for the manufacture of fibers and films has to be of extreme purity. The preparation of terephthalic acid having a quality necessary for the manufacture of fibers, however, is very difficult. On the other hand, purification of the dimethyl ester thereof by distillation and recrystallization is very easy, so that dimethyl - terephthalate (DMT) having an excellent purity is manufactured on a large scale.

The reaction of DMT with glycol also yields bis-($\beta$-hydroxyethyl)-terephthalate, the oligomers and low molecular weight polycondensates thereof. These transesterification products may be processed under the same conditions as the cited esterification products to form high molecular weight polyesters.

The process of transesterification of DMT with glycol, however, has some drawbacks. First of all, the transesterification reaction proceeds more slowly in industrial practice than the esterification reaction. Furthermore, the quantitative transesterification degree has to be correspondingly maintained in order to avoid trouble with the polycondensation reaction, for transesterification products having a poor transesterification degree and thus an increased content of methoxyl groups require longer polycondensation times and yield polyesters of lower molecular weight. Finally, catalysts are required for the transesterification reactions, which catalysts on the other hand greatly favour the cracking reaction of thermal decomposition, so that, after the transesterification, their effect has to be blocked by stabilizers.

So, the most appropriate starting substance for the preparation of high molecular weight polyethyleneterephthalate is a terephthalic acid having the purity degree of DMT. Such a terephthalic acid may be prepared by hydrolysis or saponification of corresponding DMT.

In German Pat. No. 1,299,627, a process for the preparation of high-purity terephthalic acid by hydrolysis of DMT is described. In order to shorten the long hydrolysis time, neutral salts are added in this process, furthermore, the terephthalic acid so obtained is after-treated by washing with water and finally with a water-miscible organic solvent. The after-treatment may also be a steam-distillation in order to eliminate the last residues of its di- or monomethyl ester from the terephthalic acid.

In British Pat. No. 1,130,695, a process for the preparation of terephthalic acid by hydrolysis of DMT is described. In order to have a complete hydrolysis according to this process, either a very long reaction time is required, or such an amount of water must be used as to obtain a complete dissolution of all of the terephthalic acid at the desired reaction temperature.

In contrast to the opinion prevailing until now it has been surprisingly found that for the preparation of high molecular weight polyethyleneterephthalate it is not at all necessary to use a terephthalic acid being free from alkoxy groups as starting substance, but that also particularly combined mixtures of terephthalic acid and its mono- and dialkyl esters may be used for this purpose without giving rise to the expected drawbacks (long polycondensation time, lower molecular weight of the polycondensation product). Furthermore, it has been found that this statement made on the preparation of high molecular weight polyethyleneterephthalate using a mixture of terephthalic acid and terephthalic acid esters is valid in an analogous manner also for the preparation of other known high molecular weight film- and fiber-forming polyesters.

The present invention thus provides a process for the manufacture of film- and fibers-forming polyesters by polycondensation of suitable known bis-diol-dicarboxylic acid esters and/or their low molecular weight oligomers, wherein the bis-diol-carboxylic acid esters and/or their low molecular weight oligomers are obtained by reaction of (a) diols known as diol components of film- and fiber-forming polyesters and (b) a dicarboxylic acid/dicarboxylic acid alkyl ester mixture, the dicarboxylic acid components of which are also known as dicarboxylic acid components of film- and fiber-forming polyesters; in this dicarboxylic acid/dicarboxylic acid alkyl ester mixture the proportion of the number of the free carboxyl groups to that of the esterified carboxyl groups being at least 60:40.

As diols for the preparation of the cited bis-diol-dicarboxylic acid esters and their low molecular weight oligomers, all diols known as components for film- and fiber-forming polyesters may be used, alone or as mixtures; especially aliphatic and cycloaliphatic diols having from 2 to 12 carbon atoms, for example ethylene glycol, tri-, tetramethylene glycol, 2-methyl-propanediol, 2,2-dimethyl-propanediol, 1,4-cyclohexane-dimethanol. The diol to be preferred is ethylene glycol.

As dicarboxylic acid components of the cited dicarboxylic acid/dicarboxylic acid alkyl ester mixture, such dicarboxylic acids may be used which are also known as components for film- and fiber-forming polyesters, i.e. especially aromatic, straight-chain aliphatic and/or cycloaliphatic dicarboxylic acids having from 6 to 20 carbon atoms, for example isophthalic acid, 4,4'-diphenyl-dicarboxylic acid, diphenylmethane-4,4'-dicarboxylic acid, diphenylsulfonyl-4,4'-dicarboxylic acid, naphthalene-1,2-, -1,3-, -1,4- and -1,8-dicarboxylic acid, 5-sulfo-isophthalic acid, adipic, sebacic or hexahydroterephthalic acid; terephthalic acid is to be preferred. The dicarboxylic acid/dicarboxylic acid alkyl ester mixture may be derived as well from one and the same dicarboxylic acid, for example terephthalic acid, as from several different dicarboxylic acids. In the first case, when only one diol is used as reaction component, homopolyesters are obtained, in the latter case, copolyesters are formed. Of course, copolyesters may also be prepared from one dicarboxylic acid and several diol components.

Alkyl esters of the cited dicarboxylic acid alkyl esters are mono- and dialkyl esters of aliphatic alcohols having preferably from 1 to 4 carbon atoms (methanol, ethanol, $i$- and $n$- propanol, $n$-butanol; preferably methanol). It is very important to see to it that the proportion of the number of the free carboxyl groups to that of the esterified carboxyl groups in the dicarboxylic acid/dicarboxylic acid alkyl ester mixture is at least 60:40. In this connection it should be pointed out that the limit ratio of the number of the free carboxyl groups to that of the esterified carboxyl groups of 100:0 cannot be applied, since it is an acid/acid ester *mixture* which must always be used. As already mentioned, according to the process of the invention, film- and fiber-forming polyesters, i.e. homo- and copolyesters, can be prepared, preferably polyethyleneterephthalate. In this latter case, as starting substances for the polycondensation bis-($\beta$-hydroxyethyl)-terephthalate and/or its low molecular weight oligomers are used which are obtained by reaction of (a) ethylene glycol with
(b) a terephthalic acid/terephthalic acid alkyl ester mixture, preferably a terephthalic acid methyl ester mixture, in which the proportion of the number of free carboxyl groups to that of the esterified carboxyl groups is at least 60:40.

Furthermore, when carrying out the process of the invention, it is preferable to obtain the dicarboxylic acid/dicarboxylic acid alkyl ester mixture by partial hydrolysis of the dicarboxylic acid alkyl ester(s) or by mixing the free dicarboxylic acid(s) with their mono- and/or dialkyl ester(s). It is of course possible to prepare the acid/acid ester mixture also by any other method, for example by decomposition in an aqueous alcoholic medium of polyester or copolyester wastes which advantageously are cleaned from impurities such as finishing agents, etc.

In the process of the invention, starting from a reaction product which has been prepared by partial hydrolysis of corresponding dicarboxylic acid esters with pure water and which has a hydrolysis degree of at least 60%, after its reaction with the corresponding diol or diols and despite the still present carbalkoxy groups, a polycondensate is obtained which despite a short polycondensation time does not possess the low polycondensation degree to be expected hitherto according to the state of the art. On the contrary, the polyesters and copolyesters prepared in the process of the invention from corresponding dicarboxylic acid/dicarboxylic acid alkyl ester mixtures can be easily obtained in any desired polycondensation degree by using the known methods of reaction control by means of a temperature-time-pressure program. The polyesters and copolyesters obtained are excellently suitable for the preparation of fibers, filaments, films or sheets or, optionally, also plastics.

When the acid/acid ester mixture is prepared by hydrolysis of the corresponding neutral esters, it is advantageous to use pure water without any additives, especially without catalysts. For reasons of cost, however, or in order to recover solvents, mixtures of water and organic solvents may also be used.

The hydrolysis as such is carried out at temperatures of from 150° to 300° C. under the pressure establishing itself in an autoclave at these temperatures. Thus, a temperature rise means a considerable acceleration of the reaction. Temperatures of from 225° to 270° C. are preferred. In order to achieve a thorough blending, an efficient agitator is advantageously used. For the hydrolysis reaction, the reaction components should be advantageously used in a determined molar ratio. In order to achieve the establishment of an equilibrium with respect to the acid, it is recommended to use an at least five-fold molar excess of water. Furthermore, the amount of water should be sufficient to ensure that after hydrolysis a product is obtained which can be easily pumped. After the end of the hydrolysis reaction, the hydrolysis degree should be 60%, as already mentioned, but it should not attain the limit value of 100%. When the hydrolysis degree is too low, too large an amount of sublimate (sublimation of the often easily sublimating neutral esters at elevated temperature) may be formed during the further processing, which of course is undesirable.

The hydrolysis is carried out either without extraction of alcohol, or the easily volatile components (for example methanol or ethanol) are eliminated from the reaction zone by means of a separator column mounted on the pressure side of the hydrolysis apparatus.

The process may also be carried out continuously while using one or more reaction vessels which may be designed and equipped as stirring vessels or as tube reactors with or without packing, etc. Feeding in of the reaction components and extraction of the reaction products have to be carried out in a manner which ensures that there is no blending of these substances. A continuous process offers better possibilities of pre-heating the substances to be used by means of the reaction products in a countercurrent heat exchanger.

The hydrolysis product is separated from the water in excess by known methods. The subsequent reaction with glycol is carried out without the addition of catalysts. For a diglycol inhibition, however, known compounds, for example quaternary ammonium or phosphonium compounds may be used; the same goes for dulling agents.

The polycondensation reaction is carried out under known reaction conditions, using known catalysts, for example antimony trioxide.

The following examples illustrate the invention.

EXAMPLE 1

1500 g. of terephthalic acid dimethyl ester and 1500 g. of water were heated for 45 minutes at 250° C., with thorough agitation, in an autoclave under a nitrogen blanket. After cooling, the reaction product was filtered off and dried. The acid number was determined by titration; the hydrolysis degree calculated on the acid number was 70%.

In a second autoclave equipped with an anchor stirrer, a fractionating column which can be heated, a pressure reducing valve and a condenser, 580 g. of dried hydrolysis product and 324 g. of glycol were heated to 270° C. under a nitrogen atmosphere and under pressure. The temperature of the column was adjusted to 170° C. by means of a thermostat. After a reaction time of 45 minutes, 130 ml. of water were distilled off by means of methanol. A mixture of terephthalic acid glycol esters and their oligomers was obtained which was directly used for the polycondensation reaction for the preparation of polyethyleneterephthalate.

The analysis of the esterification product had the following results:

120 milliequivalents of COOH/kg.
415 milliequivalents of $OCH_3$/kg.
78 mmols of diglycol/kg.

After 215 mg. of antimony trioxide were added to the esterification product, the pressure was decreased, while constantly stirring, from 760 mm. Hg to 0.1 mm. Hg within 1 hour. The temperature of the product during this operation was 250° C., and was increased to 275° C.

after the final vacuum was attained. Within a polycondensation time of 100 minutes at 0.1 mm. Hg, a polyester was obtained having the specific viscosity $\eta_{spec}$ of 0.98, measured on a 1% solution of phenol/tetrachloroethane=3:2 at 25° C. The polyester had a DTA melting point of 254° C., a diglycol content of 97 mmols/kg. and a carboxyl group content of 12.8 milliequivalents/kg.

The polyester obtained was spun in an extruder through a nozzle having 24 holes of a hole diameter of 0.25 mm. at the temperature profile of 250°, 275°, 295°, 290°, 284° C., the speed of feeding-in having been 18.3 g./min. and the draw-off speed 1000 m./min.

After the drawing at a rate of 1:3.65 and an ironing temperature of 150° C., and after the fixing at 90° C., the following filament properties resulted:

| | |
|---|---|
| Lightness [1] | 77.0 |
| Yellow value [1] | 3.6 |
| Breaking load p/dtex | 4.2 |
| Elongation at break percent | 29.8 |
| Titer dtex | 58.7 |

[1] Measured by means of the Elrepho apparatus of Messrs. Zeiss, Wetzlar.

EXAMPLE 2

600 g. of terephthalic acid dimethyl ester and 2000 ml. of water were hydrolysed in an autoclave with thorough agitation at 225° C. After 1 hour of reaction time, the hydrolysis degree was 79%. As described in Example 1, the hydrolysis product was esterified with glycol and subsequently polycondensed.

After an esterification time of 30 minutes, the reaction product had the following analysis results:

78 milliequivalents of COOH/kg.
225 milliequivalents of OCH$_3$/kg.
78 mmols of diglycol/kg.

After a polycondensation time of 90 minutes, the polyester had the specific viscosity $\eta_{spec}$ of 0.94, a DTA melting point of 254° C., a diglycol content of 106 mmols/kg. and a carboxyl group content of 15 milliequivalents/kg.

EXAMPLE 3

In an autoclave, 1600 g. of terephthalic acid dimethyl ester and 1200 ml. of water were hydrolysed with thorough agitation. The methanol formed in the reaction was released. After a reaction time of 60 minutes at 250° C., 92% of the ester used were hydrolysed.

After the suction-filtration, 650 g. of the moist hydrolysis product having a content of residual water of 70 g., were esterified with 260 g. of glycol. After 50 minutes of reaction time at 270° C., the reaction product had the following analysis values:

540 milliequivalents of COOH/kg.
93 milliequivalents of OCH$_3$/kg.
83 mmols of diglycol/kg.

The polycondensation reaction carried out under the same conditions as described in Example 1 yielded after 75 minutes a polyester having the specific viscosity $\eta_{spec}$ of 1.05, a DTA melting point of 250° C., a diglycol content of 141 mmols/kg. and a carboxyl group content of 29 milliequivalents/kg.

EXAMPLE 4

In an autoclave, 1600 g. of terephthalic acid dimethyl ester and 1200 ml. of water were hydrolysed at 225° C. while stirring thoroughly. After 1 hour, the hydrolysis degree was 62%.

As described in Example 1, the hydrolysis product was esterified with glycol and subsequently polycondensed.

After an esterification time of 45 minutes, the reaction product had the following analysis values:

78 milliequivalents of COOH/kg.
116 mmols of diglycol/kg.
620 milliequivalents of OCH$_3$/kg.

After a polycondensation time of 100 minutes, the polyester had a specific viscosity $\eta_{spec}$ of 0.76, a DTA melting point of 252° C., 9 milliequivalents/kg. of COOH and 81 mmols of diglycol/kg.

EXAMPLE 5

In an autoclave, while stirring thoroughly, a mixture of 720 g. of terephthalic acid dimethyl ester and 80 g. of isophthalic acid dimethyl ester was hydrolysed at 260° C. with 1900 g. of water. After 45 minutes of reaction time, the hydrolysis degree was 94%. As described in Example 1, the hydrolysis product was esterified with glycol and subsequently polycondensed.

After 30 minutes of esterification time, the reaction product yielded the following analysis values:

104 milliequivalents of COOH/kg.
256 milliequivalents of OCH$_3$/kg.
118 mmols of diglycol/kg.

After a polycondensation time of 70 minutes, the polyester had a specific viscosity $\eta_{spec}$ of 0.9, a DTA melting point of 238° C., a diglycol content of 136 mmols/kg. and a carboxyl group content of 23 milliequivalents/kg.

EXAMPLE 6

In an autoclave equipped with an anchor stirrer, a fractionating column which can be heated, a pressure reducing valve and a condenser, a mixture of 1000 g. of DMT, 1200 g. of terephthalic acid and 720 g. of glycol were heated to 270° C. under a nitrogen blanket and under pressure. Via a column, a mixture of methanol and water were distilled off. After a reaction time of 120 minutes, the product yielded the following analysis values:

130 milliequivalents of COOH/kg.
245 milliequivalents of OCH$_3$/kg.
145 mmols of diglycol/kg.

After addition of 500 mg. of antimony trioxide, within 105 minutes of polycondensation time under the conditions as described in Example 1, a polyester was obtained which had a viscosity $\eta_{spec}$ of 0.78, a DTA melting point of 249° C., a content of 25 milliequivalents of COOH/kg. and 138 mmols of diglycol/kg.

What is claimed is:

1. A process for making bis-esters of aromatic dicarboxylic acids and diols and/or low molecular weight oligomers thereof adapted to be polycondensed to produce film- and fiber-forming polyesters, which process consists essentially of reacting at least one of said diols with a hydrolysate of at least one aromatic dicarboxylic acid bis-alkyl ester, the degree of hydrolysis in said hydrolysate being at least 60% but less than 100% and said hydrolysate is produced in the absence of any catalyst.

2. A process according to Claim 1 wherein said diol is ethylene glycol and said hydrolysate is a hydrolysate of dimethyl terephthalate.

3. A process for making bis-esters of aromatic dicarboxylic acids and diols and/or low molecular weight oligomers thereof adapted to be polycondensed to produce film- and fiber-forming polyesters, which process consists essentially of hydrolyzing in the absence of any catalyst at least one bis-alkyl ester of an aromatic dicarboxylic acid to form a hydrolysate having a degree of hydrolysis of at least 60% but less than 100%, and reacting said hydrolysate with at least one of said diols to produce said bis-diol ester.

4. A process according to Claim 3 wherein said diol is ethylene glycol and said dicarboxylic acid is terephthalic acid.

5. A process for making bis-esters of an aromatic dicarboxylic acid and diols and/or low molecular weight oligomers thereof adapted to be polycondensed to produce film- and fiber-forming polyesters, which process consists essentially of hydrolyzing in the absence of any catalyst a bis-alkyl ester of an aromatic dicarboxylic acid to form a hydrolysate having a degree of hydrolysis of at least 60% but less than 100% and reacting said hydrolysate with at least one of said diols to produce said bis-diol ester.

References Cited

UNITED STATES PATENTS

| | | | |
|---|---|---|---|
| 2,855,432 | 10/1958 | Binder et al. | 260—475 |
| 2,877,262 | 3/1959 | Binder et al. | 260—475 |
| 3,639,448 | 2/1972 | Matsuzawa et al. | 260—475 |

FOREIGN PATENTS

| | | |
|---|---|---|
| 25,573 | 10/1969 | Japan. |
| 27,637 | 11/1968 | Japan. |

MELVIN GOLDSTEIN, Primary Examiner

U.S. Cl. X.R.

260—75 M

UNITED STATES PATENT OFFICE
CERTIFICATE OF CORRECTION

Patent No. 3,836,574      Dated September 17, 1974

Inventor(s) Achsel et al.

It is certified that error appears in the above-identified patent and that said Letters Patent are hereby corrected as shown below:

In the Heading:

After "Serial No. 371,662" insert -- claim priority, application Germany, September 30, 1970, P 20 43 630.0 --.

Signed and sealed this 5th day of November 1974.

(SEAL)
Attest:

McCOY M. GIBSON JR.
Attesting Officer

C. MARSHALL DANN
Commissioner of Patents